(12) United States Patent
Brown et al.

(10) Patent No.: US 9,477,890 B2
(45) Date of Patent: Oct. 25, 2016

(54) OBJECT DETECTION USING LIMITED LEARNED ATTRIBUTE RANGES

(71) Applicant: International Business Machines Corporation, Armonk, NY (US)

(72) Inventors: Lisa M. Brown, Pleasantville, NY (US); Rogerio S. Feris, Hartford, CT (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/073,420

(22) Filed: Nov. 6, 2013

(65) Prior Publication Data

US 2015/0125083 A1    May 7, 2015

(51) Int. Cl.
*G06K 9/00* (2006.01)
(52) U.S. Cl.
CPC ................ *G06K 9/00771* (2013.01)
(58) Field of Classification Search
None
See application file for complete search history.

(56) References Cited

U.S. PATENT DOCUMENTS

| | | | |
|---|---|---|---|
| 6,829,384 B2 * | 12/2004 | Schneiderman et al. | 382/154 |
| 7,796,161 B2 | 9/2010 | Oya | |
| 2004/0264807 A1 * | 12/2004 | Yakhini et al. | 382/289 |
| 2010/0103286 A1 | 4/2010 | Akiyama | |

FOREIGN PATENT DOCUMENTS

JP    2007193588 A    8/2007

OTHER PUBLICATIONS

Aggarwal, JK.-et al.; "Analyzing Dynamic Scenes Containing Multiple Moving Objects"; http://www.ip.com/pubview/IPCOM000152061D; Jan. 31, 1980.
Jain, R.-et al.; "Dynamic Scene Analysis"; http://www.ip.com/pubview/IPCOM000128468D; Jan. 1, 1984.
Omer, I.-et al.; "Identifying Plane Outliers in Scenes Using Re-Projection for Privacy Protection"; http://www.ip.com/pubview/IPCOM000183324D; May 19, 2009.

* cited by examiner

*Primary Examiner* — Hadi Akhavannik
(74) *Attorney, Agent, or Firm* — Ryan, Mason & Lewis, LLP

(57) ABSTRACT

Techniques for object detection are provided that employ limited learned attribute ranges. One or more objects are initially detected for a full range of one or more attributes at each location of an image. Thereafter, a set of positional constraints are generated indicating an expected range of values for each position in the image for one or more of the attributes based on the detected objects employing a geometric model of a scene in the image. Objects are then detected in the image using the expected range of values for each position in the image for the one or more the attributes. The attributes comprise, for example, one or more of size, pose and rotation of the objects. A best fit is computed to the geometric model to generate the set of positional constraints, for example, using a least squares approach.

25 Claims, 5 Drawing Sheets

OBJECT DETECTION USING LIMITED LEARNED ATTRIBUTE RANGES

FIELD OF THE INVENTION

Embodiments of the invention generally relate to information technology, and, more particularly, to object detection tools.

BACKGROUND

Object detection employs computer vision and image processing techniques to detect semantic objects (such as humans or vehicles) in digital images and videos. Object detection techniques are often used, for example, for image retrieval and video surveillance. Object detection is typically performed using a sliding window approach in which the entire image is searched by sliding a window across the image in a scan-line fashion, testing for the object at each position. In addition, the search may include the range of each of several attributes at each position, such as for various sizes, rotations and poses. The cumulative search space is often very large resulting in high computational costs.

A need therefore exists for more computationally efficient techniques for object detection of images.

SUMMARY

In one aspect of the present invention, techniques for object detection are provided that employ limited learned attribute ranges. An exemplary computer-implemented method can include steps of detecting one or more objects for a full range of one or more attributes at each location of an image; generating a set of positional constraints indicating an expected range of values for each position in the image for one or more of the attributes based on the detected objects, wherein the generating step employs a geometric model of a scene in the image to generate the set of positional constraints and wherein the expected range of values for at least one position in the image is inferred based on one or more other positions in the image; and detecting one or more objects in the image using the expected range of values for each position in the image for the one or more of the attributes.

The attributes comprise, for example, one or more of size, pose and rotation of the objects. In one exemplary embodiment, the detected objects are limited to objects above a predefined confidence level indicating a likelihood of an accuracy of the detection of a corresponding object.

According to one aspect of the invention, a best fit is computed to the geometric model of a scene in the image to generate the set of positional constraints, for example, using a least squares approach. The geometric model comprises, for example, a three-dimensional geometric model of a camera that generated the image based on consistency across the image and physical geometric constraints based on a viewpoint of the camera and a corresponding perspective distortion.

These and other objects, features and advantages of the present invention will become apparent from the following detailed description of illustrative embodiments thereof, which is to be read in connection with the accompanying drawings.

DETAILED DESCRIPTION

Aspects of the present invention provide improved object detection efficiency using learned attribute ranges. According to one aspect of the invention, attribute ranges for a given camera configuration are learned for each position in the scene. In one exemplary embodiment, learning is performed while processing a static camera feed and uses the mathematical constraints of the geometry of the scene to thereby limit the search space. Once the information about the desired attributes (such as size, pose and/or rotation type) is learned, object detection is more efficient by limiting the search at each position for objects with the appropriate scale, rotation, pose etc. In this manner, the expected object attributes are learned, such as an expected object size, so that the object detection search may be limited to objects having the expected object attribute for each position in the image (e.g., object size). For example, the search at each position can be limited to objects of an expected size for the viewpoint and particular image location.

Aspects of the present invention thus recognize that certain objects, such as pedestrians and vehicles, have an expected size at each portion of an image and are normally expected to be present only on the ground portion of an image. In one exemplary embodiment, a size map is created indicating an expected size of objects, such as pedestrians, for each position in the image. The exemplary size map is then used to limit the range of sizes that are searched for detection at each location in an image, to thereby reduce the search space, improve processing speed and reduce false positives.

While the present invention is illustrated herein primarily using a size attribute, the disclosed techniques can be employed using other image attributes, such as pose and rotation, as would be apparent to a person of ordinary skill in the art.

Figure 1:
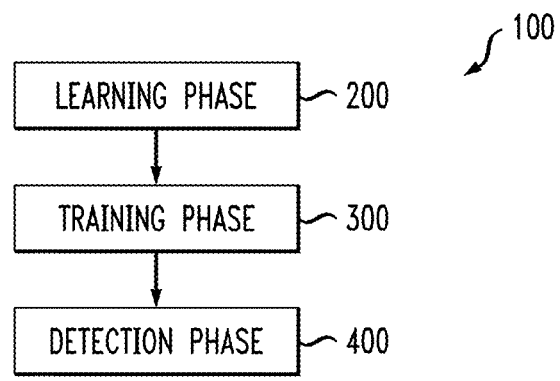
FIG. 1 is a flow chart illustrating an exemplary implementation of a limited attribute range object detection process incorporating aspects of the present invention.
Figure 2:
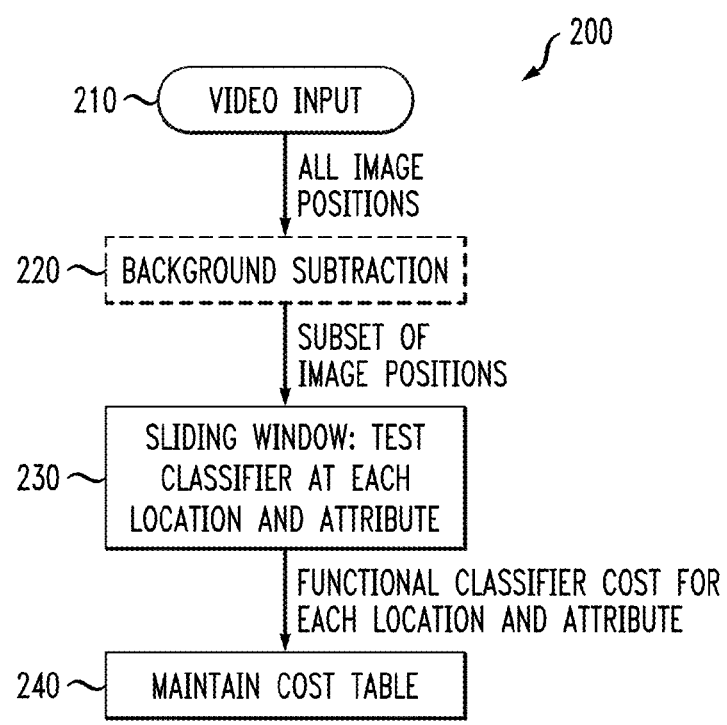
FIG. 2 is a flow chart illustrating an exemplary implementation of a learning phase of FIG. 1 in further detail.

FIG. 1 is a flow chart illustrating an exemplary implementation of a limited attribute range object detection process 100 incorporating aspects of the present invention. As shown in FIG. 1, a learning phase 200, as discussed further below in conjunction with FIG. 2, is initially performed using a full range of detection size at each image location. Thereafter, the exemplary limited attribute range object detection process 100 then performs a training phase 300, as discussed further below in conjunction with FIG. 3, that processes all detections (e.g., size and image position of each detected object) above a predefined confidence level. The exemplary training phase 300 uses the qualifying object detections (e.g., size and position) to generate a size map using, for example, a least squares fit to a plane. As discussed further below, the exemplary training phase 300 optionally remove outliers and iterates. An exemplary detection phase 400 is then performed that uses the exemplary size map to limit the range of sizes that are searched for detection at each location in an image.

FIG. 2 is a flow chart illustrating an exemplary implementation of a learning phase 200 incorporating aspects of the present invention. During the learning phase 200, the object detection system 700, as discussed further below in conjunction with FIG. 7, initially runs a standard sliding window approach across the full range of attributes. The output of the learning phase 200 can optionally be augmented with confidence information based on detection and/or tracking information. The exemplary learning phase 200 collects location, size, pose, rotation, and other image properties of detected objects from one or more images (if multiple images from a static camera) and information pertaining to the confidence or likelihood of the accuracy of the detection (such as track information, image properties such as resolution or a measure of contrast, or detection confidence). Object detection can be for any real-world objects, such as people, vehicles, bicycles, types of vehicles and dogs.

As shown in FIG. 2, the exemplary video input 210 is optionally applied to a background subtraction process during step 220, to obtain Background Subtraction (BGS) video, so that only a subset of image positions are processed corresponding to moving objects, in a well-known manner.

The object detection classifier is applied to each location during step 230 using a sliding window approach, to determine if an object is present and to obtain the attribute values. The object detection classifier determines a functional classifier cost for each location and attribute. A corresponding cost table is generated during step 240, with or without non-maximal suppression (i.e., select the object in a local image area with the highest detection value).

In one exemplary embodiment, the cost table generated during step 240 is optionally augmented with confidence information based on detection and/or tracking information.

Generally, as discussed further below, the learning phase 200 learns the expected relative size of objects in the image with respect to the real three-dimensional space associated with the image. For example, in the exemplary embodiment where the object detection search is limited to objects having an expected size attribute for each position in the image, an object bounding box (size) is determined for each image position, indicating the expected height of detected objects (e.g., humans) in the image.

Figure 3:
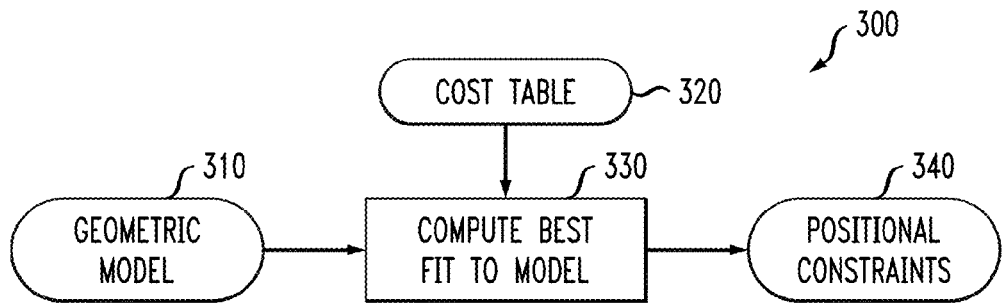
FIG. 3 is a flow chart illustrating an exemplary implementation of a training phase of FIG. 1 in further detail.

FIG. 3 is a flow chart illustrating an exemplary implementation of the training phase 300 incorporating aspects of the present invention. Generally, as discussed further below, the exemplary training phase 300 processes the output of the learning phase (i.e., the cost table) to find the parameters of a three-dimensional geometric model of the camera based on expectations of consistency across the image and physical geometric constraints based on camera viewpoint and the corresponding perspective distortion. In one exemplary embodiment, the ground plane in the scene is assumed to be planar and a least squares estimation is used to fit a planar model, outliers are removed and the process iterates until the fit is sufficiently accurate.

As shown in FIG. 3, the exemplary training phase 300 obtains a geometric model 310, such as a planar ground, and a cost table 320 generated during the learning phase 200. The exemplary training phase 300 computes a best fit to the geometric model of the scene during step 330, using, for example, a least squares approach, and generates the positional constraints 340 (e.g., the expected size at each image location). The exemplary positional constraints 340 provide a distribution of the size of objects in the real world (people, vehicles, bicycles etc.). In this manner, the training phase 300 generates an attribute map of positional information of size, rotation, pose, type etc.

Figure 4:
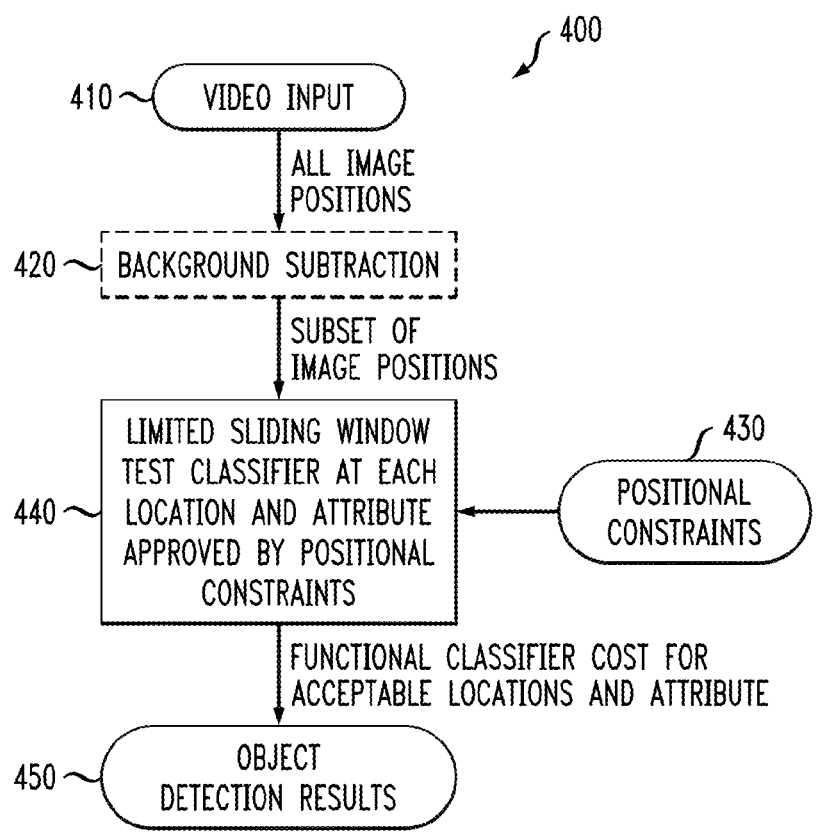
FIG. 4 is a flow chart illustrating an exemplary implementation of a detection phase of FIG. 1 in further detail.

FIG. 4 is a flow chart illustrating an exemplary implementation of the detection phase 400 incorporating aspects of the present invention. Generally, the detection phase 400 processes the positional constraints 340 (e.g., the size map) generated by the training phase 300 to perform a constrained search for the final classification. In this manner, the detection phase 400 uses the geometry derived in the training phase 300 to reduce the search range for subsequent object detection. As indicated above, the search range can be reduced for one or more object attributes, such as size, pose or rotation.

As shown in FIG. 4, the detection phase 400 processes all image positions of a video input 410 from the exemplary static camera. The detection phase 400 optionally applies a background subtraction during step 420 to limit the processed portion of the image to a subset of image positions corresponding to moving objects, in a known manner.

During the detection phase 400, the object detection system 700 (FIG. 7) employs a limited sliding window approach during step 440 using a limited range of attributes based on the positional constraints 430 generated by the training phase 300. In this manner, the detection phase 400 applies the test classifier at each location and attribute approved by the positional constraints 430.

The classifier generates a functional classifier cost for acceptable locations and attributes as the object detection results 450.

Figure 5:
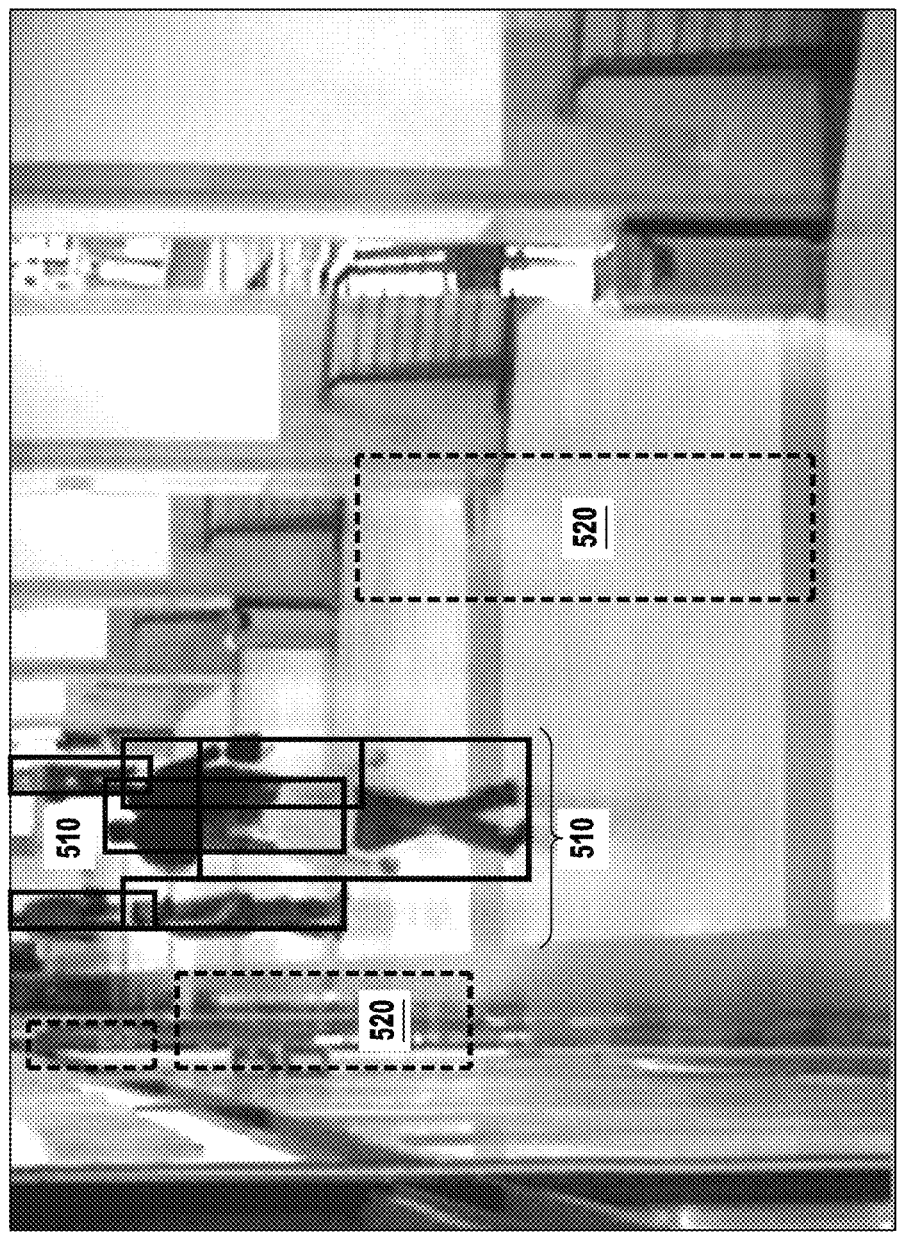
FIG. 5 illustrates an exemplary image that can be processed by an exemplary object detection system incorporating aspects of the present invention.
Figure 7:
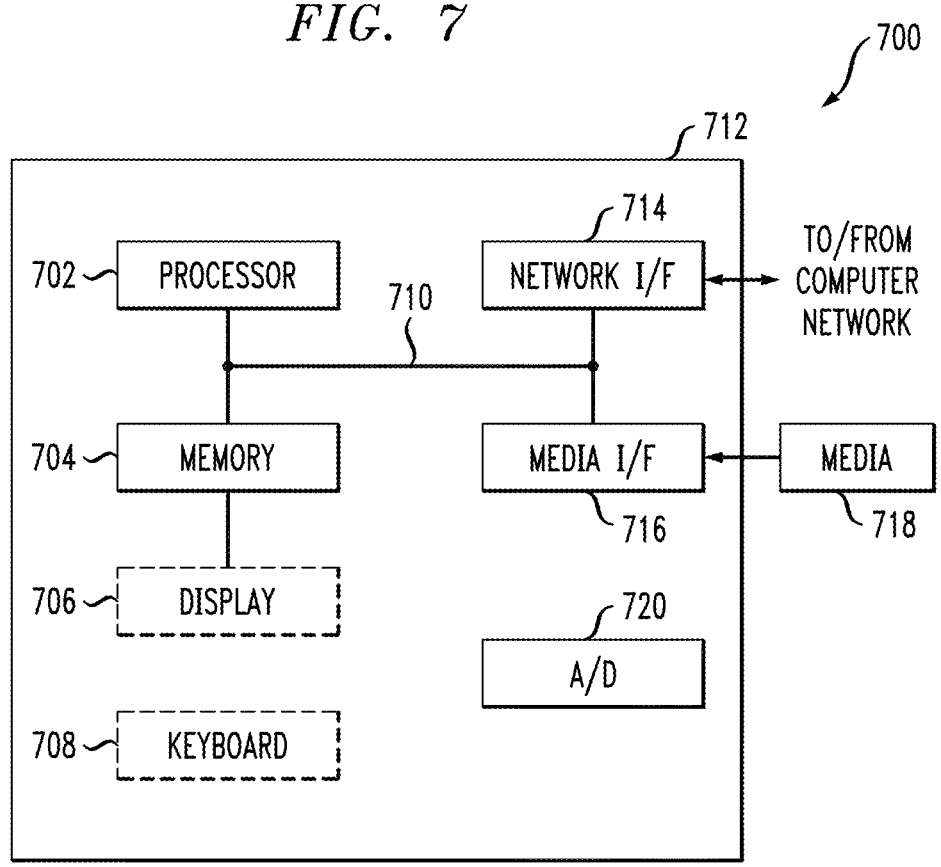
FIG. 7 depicts an exemplary object detection system that may be useful in implementing one or more aspects and/or elements of the present invention.

FIG. 5 illustrates an exemplary image 500 that can be processed by the exemplary object detection system 700 (FIG. 7). As shown in FIG. 5, the object detection system 700 generates a number of boxes associated with objects in the image. A first set of bounding boxes 510 (with solid outline) correspond to actual objects that have been detected in the image. A second set of bounding boxes 520 (with dashed outline) indicate an expected (i.e., learned) size of objects (e.g., pedestrians) at various locations based on the learning phase 200 and training phase 300.

In one exemplary embodiment, the object detection system 700 (FIG. 7) can also learn where portions of an object may be expected, such as only an upper body at a given location, such as the bottom of the image, due to the field of view of the camera. It is noted that the exemplary numbers associated with each box indicate a confidence value.

Figure 6:
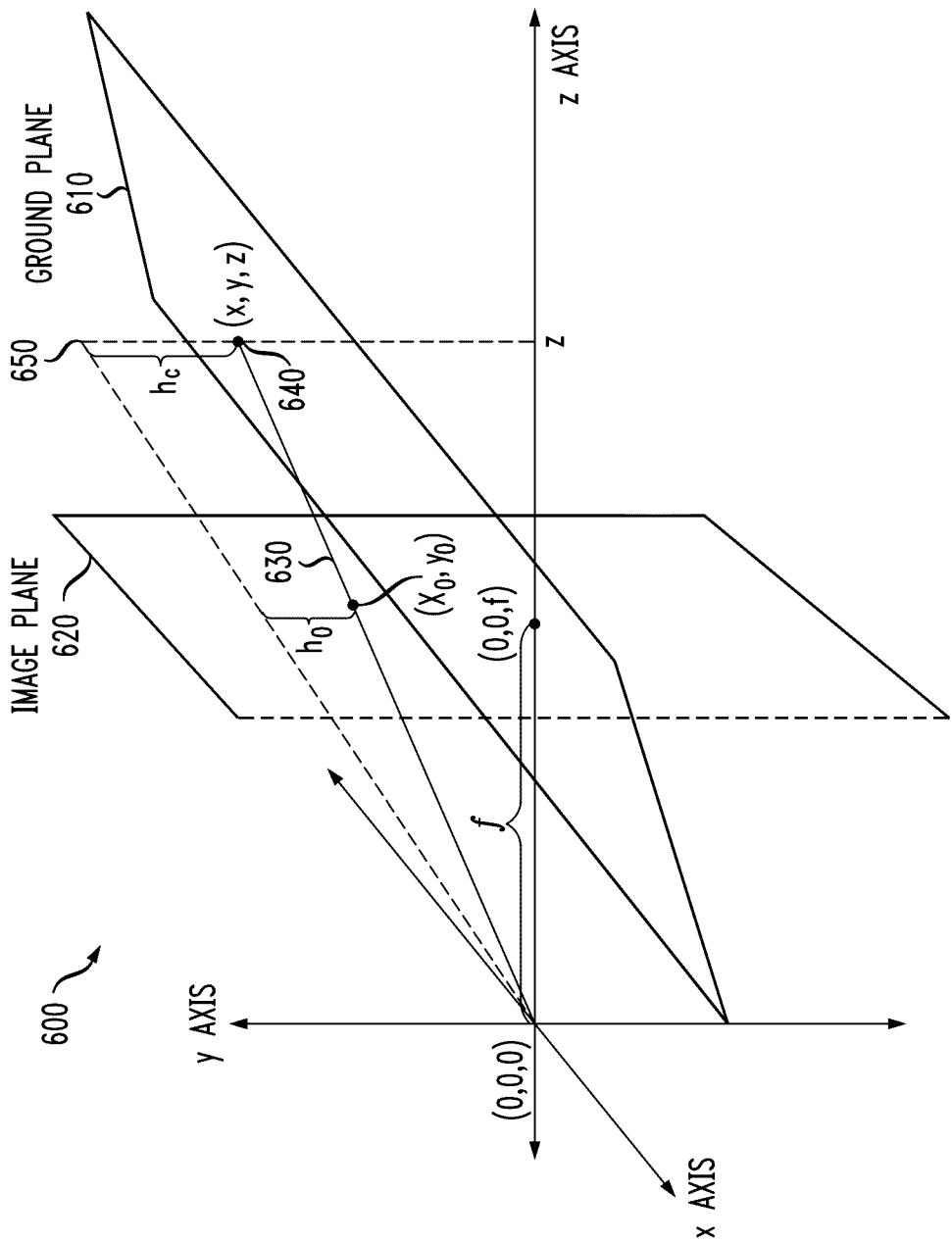
FIG. 6 illustrates a relationship between a height of a person in an image plane and the height of the person on the ground plane.

FIG. 6 illustrates the relationship between the height of a person in an image plane 620 and the height of a person on the ground plane 610. Assuming a pin-hole camera model, a point (x,y,z) on the three-dimensional ground plane 610 is projected onto a point in the image plane (x0,y0) 620, as shown in FIG. 6. Let f be the focal length or the distance from the focal point of the camera (0,0,0) to the center of the image (0,0,f). The line of sight 630 from the focal point to a point on the ground plane can be represented parametrically in z by: $(x_0 z/f, y_0 z/f, z)$. The ground plane 610 is defined as: $ax+by+cz=1$ and the canonical height of a person in three-dimensions is defined as $h_c$. The point 640 on the ground plane 610 that intersects the line of sight 630 is constrained to be:

[1]  $a(x_0 z/f)+b(y_0 z/f)+cz=1$

From equation [1], it can be inferred that, $$x = x_0/(a(x_0)+b(y_0)+cf) \quad [2]$$

$$y = y_0/(a(x_0)+b(y_0)+cf) \quad [3]$$

$$z = f/(a(x_0)+b(y_0)+cf) \quad [4]$$

Without loss of generality, it is assumed that people are vertical in the image. If not, the image can be rectified by estimating the angle of rotation around the z axis. The three-dimensional point 650 at the top of the head of the canonical person whose feet are located at (x,y,z) is given by (x, y+$h_c$, z). y' is defined as follows:

$$y' = y + h_c \quad [5]$$

The corresponding point in the image can be expressed as follows:

$$y_0' = y'f/z \quad [6]$$

The height in the image $h_0$ can be written as follows:

$$h_0 = y_0' - y_0 = (y+h_c)f/z - y_0 \quad [7]$$

$$h_0 = (y_0 z/f + h_c)f/z - y_0 \quad [8]$$

$$h_0 = h_c f/z \quad [9]$$

Replacing z with equation (4):

$$h_0 = h_c(a(x_0)+b(y_0)+cf) \quad [10]$$

From this result, it can be seen that the height in the image of a canonical person is a linear function of the image coordinates of the location of the person on the ground.

The canonical height of a person, $h_c$, is projected onto the image as $h_o$ due to the focal length, f. The positional constraints 340 comprise a number of measured $h_o$ values that are extrapolated for each location using the above geometric equations.

It is noted that a person is normal to the ground plane 610, not parallel to image plane 620, so the true height of a person is projected—and therefore different than the $h_c$ as computed above. This projection varies with y and z. As the line of sight to the ground plane angle becomes more acute, the projection becomes more severe and the relative size of the true height decreases. Similarly, when the line of sight of the ground plane 610 approaches overhead (90 degrees), the relative size of the true height is larger than the estimated height. It is assumed that the camera is tilted with respect to the ground plane which is horizontal in the real-world. In other words, it is assumed that the ground is flat, not only planar but not tilted such as a hill. People on the ground are perpendicular to the ground plane because the ground plane is orthogonal to gravity.

The techniques depicted in FIGS. 1 through 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1 through 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting one or more objects for a full range of one or more attributes at each location of an image;
   generating a set of positional constraints indicating an expected range of values for each position in said image for one or more of said attributes based on said detected objects, wherein said generating step employs a geometric model of a scene in said image to generate said set of positional constraints and wherein said expected range of values for at least one position in said image is inferred based on one or more other positions in said image, wherein said geometric model projects one or more three dimensional objects onto a two dimensional image; and
   detecting one or more objects in said image using said expected range of values for each position in said image for said one or more of said attributes.

2. The method of claim 1, wherein said one or more attributes comprise one or more of size, pose and rotation of said objects.

3. The method of claim 1, wherein said detecting step further comprises the step of limiting said detected objects to objects above a predefined confidence level.

4. The method of claim 3, where the predefined confidence level indicates a likelihood of an accuracy of the detection of a corresponding object.

5. The method of claim 1, wherein said generating step computes a fit to said geometric model of a scene in said image to generate said set of positional constraints.

6. The method of claim 5, wherein said geometric model comprises a three-dimensional geometric model of a camera that generates said image based on consistency across the image and physical geometric constraints based on a viewpoint of said camera and a corresponding perspective distortion.

7. The method of claim 5, wherein said fit is computed using a least squares approach.

8. The method of claim 5, further comprising the steps of removing one or more outliers and iterating said generating step.

9. The method of claim 1, further comprising the step of applying a background subtraction process to said image.

10. The method of claim 1, wherein said step of detecting one or more objects is applied in a sliding window across said image.

11. An article of manufacture comprising a non-transitory computer readable recordable storage medium having computer readable instructions tangibly embodied thereon which, when implemented, cause a computer to carry out a plurality of method steps comprising:
    detecting one or more objects for a full range of one or more attributes at each location of an image;
    generating a set of positional constraints indicating an expected range of values for each position in said image for one or more of said attributes based on said detected objects, wherein said generating step employs a geometric model of a scene in said image to generate said set of positional constraints and wherein said expected range of values for at least one position in said image is inferred based on one or more other positions in said image, wherein said geometric model projects one or more three dimensional objects onto a two dimensional image; and
    detecting one or more objects in said image using said expected range of values for each position in said image for said one or more of said attributes.

12. The article of manufacture of claim 11, wherein said one or more attributes comprise one or more of size, pose and rotation of said objects.

13. The article of manufacture of claim 11, wherein said detecting step further comprises the step of limiting said detected objects to objects above a predefined confidence level.

14. The article of manufacture of claim 13, where the predefined confidence level indicates a likelihood of an accuracy of the detection of a corresponding object.

15. The article of manufacture of claim 11, wherein said generating step computes a fit to said geometric model of a scene in said image to generate said set of positional constraints.

16. The article of manufacture of claim 15, wherein said geometric model comprises a three-dimensional geometric model of a camera that generates said image based on consistency across the image and physical geometric constraints based on a viewpoint of said camera and a corresponding perspective distortion.

17. The article of manufacture of claim 15, wherein said fit is computed using a least squares approach.

18. The article of manufacture of claim 15, further comprising the steps of removing one or more outliers and iterating said generating step.

19. The article of manufacture of claim 11, further comprising the step of applying a background subtraction process to said image.

20. The article of manufacture of claim 11, wherein said step of detecting one or more objects is applied in a sliding window across said image.

21. A system, comprising:
a memory; and
at least one hardware device coupled to the memory and configured for:
detecting one or more objects for a full range of one or more attributes at each location of an image;
generating a set of positional constraints indicating an expected range of values for each position in said image for one or more of said attributes based on said detected objects, wherein said set of positional constraints are generated using a geometric model of a scene in said image and wherein said expected range of values for at least one position in said image is inferred based on one or more other positions in said image, wherein said geometric model projects one or more three dimensional objects onto a two dimensional image; and
detecting one or more objects in said image using said expected range of values for each position in said image for said one or more of said attributes.

22. The system of claim 21, wherein said one or more attributes comprise one or more of size, pose and rotation of said objects.

23. The system of claim 21, wherein said detection limits said detected objects to objects above a predefined confidence level indicating a likelihood of an accuracy of the detection of a corresponding object.

24. The system of claim 21, wherein said at least one hardware device is further configured to compute a fit to said geometric model of a scene in said image to generate said set of positional constraints using a least squares approach.

25. The system of claim 21, wherein said at least one hardware device is further configured to apply a background subtraction process to said image.

* * * * *